United States Patent [19]
Embree et al.

[11] Patent Number: 5,588,382
[45] Date of Patent: Dec. 31, 1996

[54] ZONE TILLER ATTACHMENT FOR PLANTERS

[75] Inventors: Gary L. Embree; Robert A. Williams, both of Garden City, Kans.

[73] Assignee: Acra Products, LLC, Garden City, Kans.

[21] Appl. No.: 68,233

[22] Filed: May 27, 1993

[51] Int. Cl.$^6$ ..................................................... A01C 5/04
[52] U.S. Cl. ........................... 111/139; 111/157; 111/143
[58] Field of Search ..................................... 111/139, 140, 111/164, 166; 172/604, 574, 575, 612, 540, 543, 545, 546, 548, 549, 556, 189; 56/400.2, 400.21, 400; 15/197, 179, 200; 403/310, 312, 314

[56] References Cited

U.S. PATENT DOCUMENTS

| | | |
|---|---|---|
| 325,512 | 9/1885 | Elam . |
| 385,382 | 7/1888 | Stark ........................................ 172/543 |
| 587,048 | 7/1897 | Topp ......................................... 172/543 |
| 617,454 | 1/1899 | Whittier . |
| 1,229,342 | 6/1917 | Steele et al. . |
| 1,267,430 | 5/1918 | McConnell ............................... 403/314 |
| 1,493,670 | 5/1924 | Galvin ...................................... 172/543 |
| 2,586,254 | 12/1946 | Pitre . |
| 2,748,535 | 10/1951 | Skromme et al. . |
| 2,826,133 | 3/1956 | Moss . |
| 2,864,298 | 12/1958 | Toland ...................................... 172/556 |
| 3,173,498 | 6/1963 | Heilbrun . |
| 3,176,782 | 4/1965 | Bezzerides . |
| 3,212,585 | 10/1965 | Bezzerides . |
| 3,306,371 | 2/1967 | Bush . |
| 3,314,095 | 7/1967 | Prange ....................................... 15/200 |
| 3,322,204 | 5/1967 | Bezzerides et al. . |
| 3,401,753 | 9/1968 | Bezzerides et al. . |
| 3,597,910 | 8/1971 | Stewart ..................................... 56/400 |
| 3,605,907 | 9/1971 | Schuring et al. . |
| 3,718,191 | 2/1973 | Williams . |
| 4,033,270 | 7/1977 | Bezzerides et al. . |
| 4,131,163 | 12/1978 | Bezzerides . |
| 4,282,934 | 8/1981 | Bezzerides . |
| 4,295,532 | 10/1981 | Williams et al. . |
| 4,424,869 | 1/1984 | vom Braucke et al. . |
| 4,425,973 | 1/1984 | Williams et al. . |
| 4,483,401 | 11/1984 | Robertson . |
| 4,550,122 | 10/1985 | David et al. . |
| 4,585,073 | 4/1986 | Mayeda et al. . |
| 4,660,653 | 4/1987 | Mayeda et al. . |
| 4,782,654 | 11/1988 | Bezzerides . |
| 4,785,890 | 11/1988 | Martin . |
| 4,817,732 | 4/1989 | Brown ...................................... 172/548 |
| 5,076,180 | 12/1991 | Schneider . |
| 5,129,282 | 7/1992 | Bassett et al. ............................. 172/99 |
| 5,341,754 | 8/1994 | Winterton ................................. 111/139 |
| 5,461,995 | 10/1995 | Winterton ................................. 111/139 |

FOREIGN PATENT DOCUMENTS

681093  2/1970  Netherlands .

*Primary Examiner*—Dave W. Arola
*Assistant Examiner*—Robert Pezzuto
*Attorney, Agent, or Firm*—Hovey, Williams, Timmons & Collins

[57] ABSTRACT

The zone tiller attachment employs a pair of spoked tillage wheels that converge downwardly and forwardly toward one another in leading relationship to the planter and in such an orientation that their heavy, thick, blunt spokes mutually intersect and overlap one another along the lower front extremity and bottom portion of the tiller. The crossed spokes penetrate into the soil to pulverize, cultivate, and substantially disturb the soil particles in place with a churning action while also displacing surface residue to opposite sides of the path of travel, thus producing a relatively narrow band of thoroughly tilled soil having a depth extending down to or below the seed planting level such that the trailing opener can perform its trench opening and seed placement functions in the optimum manner. The individual spokes of each wheel are preferably constructed from short sections of sturdy metal cable formed by individual strands of thick wire twisted into a common, unitary body so that strength with a certain minimal amount of flexibility is achieved to prevent breakage and facilitate the self-discharge of foreign objects. The spokes are disposed at non-radial, raked backed angles so as to strip cleanly out of the soil on the rear, upsweep side of the wheels and leave the soil in place, instead of throwing it to the side.

22 Claims, 7 Drawing Sheets

ZONE TILLER ATTACHMENT FOR PLANTERS

TECHNICAL FIELD

This invention relates to farm implements of the type used to prepare the seed bed for planting operations and, more particularly, relates to a tiller device that is particularly suited for attachment to the front of a seed row planting unit for the purpose of cultivating a relatively narrow, band-like zone of soil immediately ahead of the planter and clearing such zone of surface residue and trash so as to facilitate the opening of a seed trench by the planter and the immediately subsequent deposit of seeds into such trench in good soil-contacting relationship.

BACKGROUND

With the increasing emphasis on soil conservation practices, including governmental requirements that mandate leaving a certain percentage of crop residue on the surface of the field before, during and after planting operations, there is an increasing challenge on the part of farmers and farm equipment manufacturers alike to provide equipment and farming practices that will comply with these needs and governmental standards. The assignee of the present invention has long been a strong advocate of low tillage planting practices and has been a pioneer in providing equipment to the farming industry for carrying out those practices. Some early examples of the equipment provided by applicants' assignee are depicted in U.S. Pat. Nos. 3,718,191; 4,295,532; 4,425,973; and 4,483,401, where obliquely disposed trash clearing discs are strategically positioned ahead of the planter units to clear narrow strips of bare soil and facilitate seed deposit.

More recently, others in the industry have developed planter attachments which are designed to engage a narrow band of the surface residue and move it aside without disturbing the soil beneath the residue through cultivation or lateral displacement. Examples of the latter type of non-cultivating devices are disclosed in U.S. Pat. Nos. 4,785,890 and 5,076,180.

However, one problem with the non-tilling devices is that while the cleared strip or band of soil may be more accessible to the planter opener in one sense because the residue has been largely cleared away, the soil itself has not been made more receptive to being opened up by the planter. In some cases, there may even be a ridge or peak formed down the middle of the row by the residue clearing devices which must somehow be negotiated by the opener as it prepares the slit or seed receiving trench. As a consequence, the seed placement itself is rendered inaccurate and imprecise, sacrificing the ultimate yield. Conversely, if some conventional units are set deeply enough to eliminate the formation of a ridge or peak down the middle of the row, they may literally dig and throw the soil out of the middle to form a furrow or trench, instead of moving only residue.

SUMMARY OF THE PRESENT INVENTION

Accordingly, one important object of the present invention is to provide a tiller which can be attached to each row planter in leading relationship to the opener thereof which has the function of tilling a narrow zone or band of soil immediately ahead of the opener and of also clearing such zone of surface residue so the opener can perform its seeding function in the optimum manner.

Another important object of the present invention is to provide a zone tillage tool which, while having particular utility in combination with a seed planter, can also be used in a variety of other ways, such as in connection with efficiently incorporating fertilizers, herbicides and insecticides into the soil.

Another important object of the present invention is to provide a zone tiller which, while being capable of churning and working the soil strip to improve its tilth and remove residue, leaves the disturbed and texturized soil in place within the strip instead of throwing it to the side along with the residue. This is achieved in large measure through the configuration of the individual cultivating spokes of the device, the manner in which the spokes from opposite, converging wheels of the device intersect and cross one another during entry and rearward passage beneath the soil surface, and the angle at which the spokes strip themselves cleanly up out of the soil on the rear, upsweep side of the wheels.

A further important object of the present invention includes providing the cultivating spokes of the tiller in the form of relatively stiff sections of so-called "aircraft" cable formed from twisted strands of solid metal wire so that each of the spokes is provided with a corrugated outer surface that produces increased soil turbulence and mixing as the spokes work their way in a wriggling action through the soil. Moreover, constructing the spokes from relatively thick cable sections also combines toughness with a certain degree of inherent flexibility and resiliency that enables them to provide their soil penetrating and cultivating action, yet also be flexible enough to yield without breaking when rocks and other foreign objects are stuck or tend to become wedged between the spokes. The undulating surfaces of the spokes and their somewhat inherent flexibility provides the wriggling action as the spokes move through the soil and cooperate with one another to agitate, cultivate, and disturb the soil particles.

These and other important objects of the present invention will become apparent from the description and drawings which follow.

DETAILED DESCRIPTION

Figure 1:
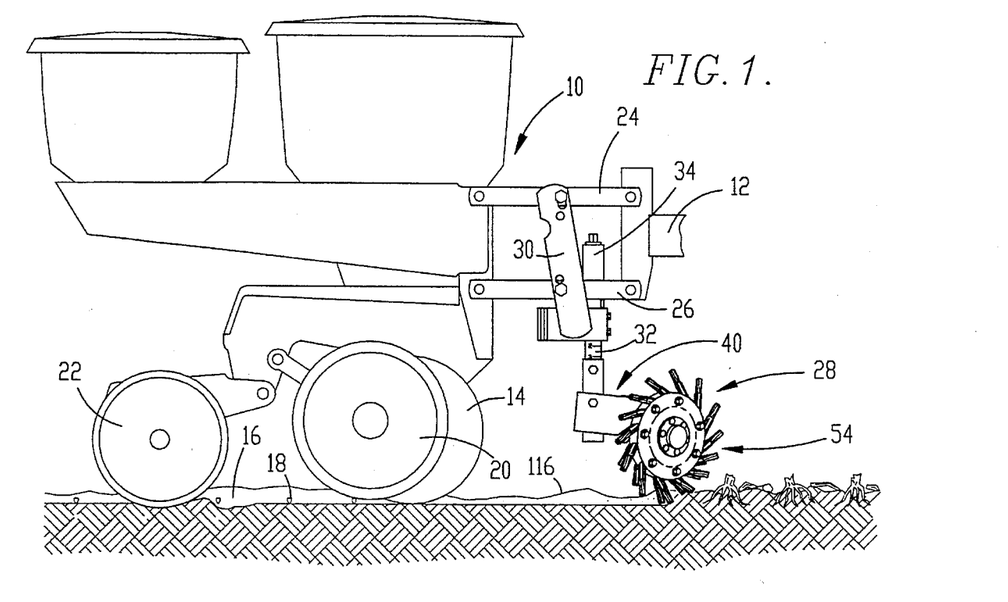
FIG. 1 is a side elevational view of a typical row crop planter employing a zone tiller attachment in accordance with the principles of the present invention.

The planter 10 in FIG. 1 is mounted on the tool bar 12 of a farm implement, as is well understood by those skilled in the art. In the illustrated embodiment, the planter 10 is provided with one or more soil slicing discs 14 that open a trench 16 in the soil for the deposit of seeds 18, one or more gauge wheels 20 positioned alongside the discs 14 for regulating the depth of soil penetration of the discs 14, and one or more trailing press wheels 22 that close the trench 16 and cover the seeds with soil. The main part of the planter 10 may be attached to the tool bar 12 through the use of upper and lower parallel links 24 and 26, respectively.

In accordance with the present invention, a zone tiller 28 is attached to the planter 10 in leading relationship with the discs 14 and seed depositing mechanism associated therewith. Conveniently, the tiller 28 may be attached to the planter 10 using generally upright mounting arms 30 secured to the upper and lower parallel links 24 and 26. Typically, four of such links 24 and 26 will be utilized for each planter 10, there being a pair of upper links 24 and a pair of lower links 26. Thus, there will correspondingly be provided a pair of the mounting arms 30 which embrace the linkage mechanism presented by the upper and lower links.

Figure 3:
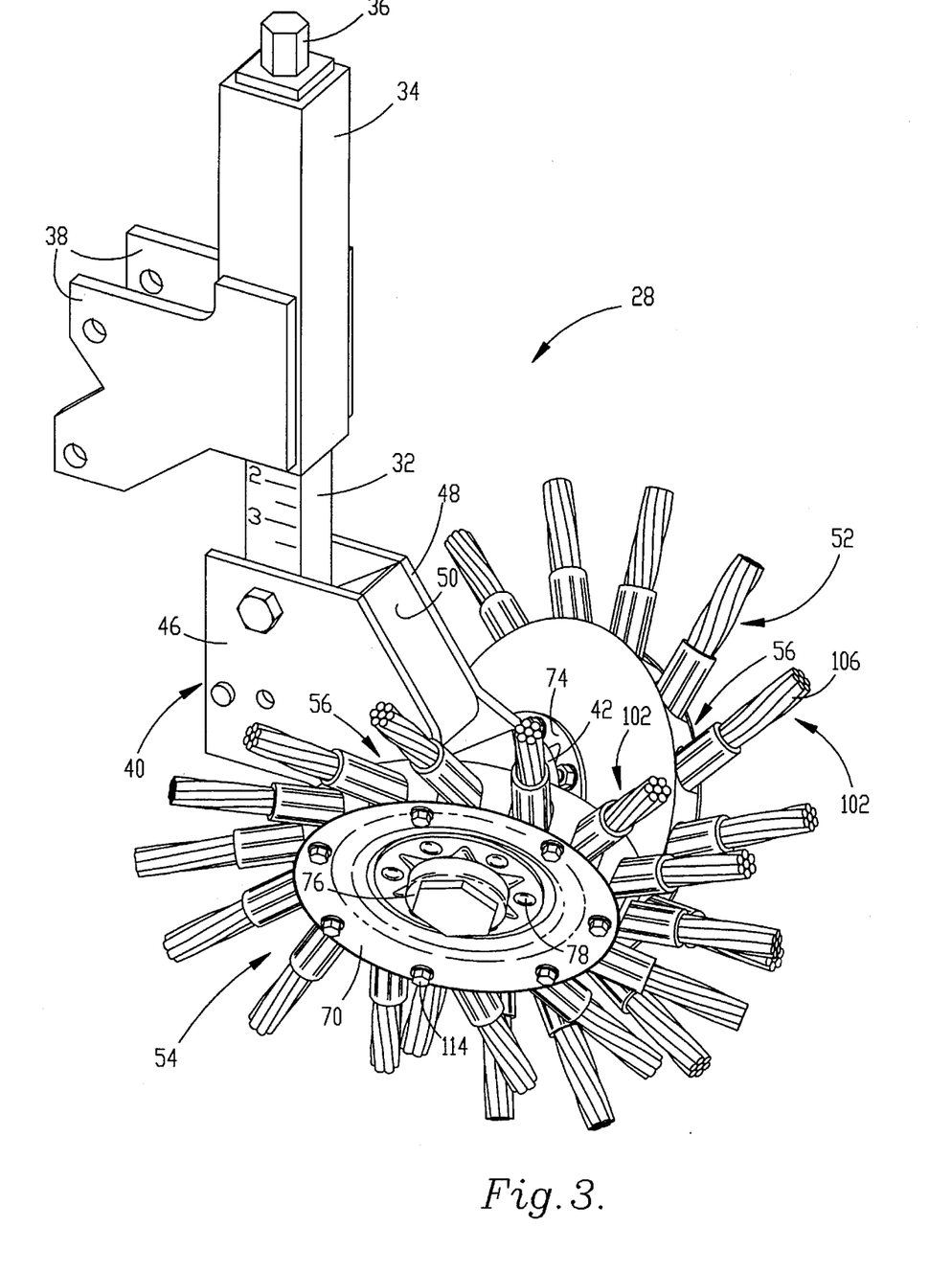
FIG. 3 is a right front isometric view of the tiller detached from the planter.

As illustrated also in particular in FIG. 3, the mounting structure for the tiller 28 includes an upright stem 32 telescopically received within a transversely rectangular housing 34 and operated in its telescoping movement by an internal screw (not shown) having a wrench head 36. Conveniently, suitable indicia may be provided on the stem 32 as illustrated in order to provide an indication of the adjusted height of the tiller 28. Suitable brackets 38 are fixed to the housing 34 and extend rearwardly therefrom for connection with other mounting bars that are ultimately secured to the mounting arms 30.

At the lower end of the stem 32, a specially configured, forwardly projecting support 40 is provided. It should be pointed out that the mounting apparatus for the tiller 28 is such that the stem 32 and housing 34 are centered with respect to the trailing planter. That is to say, the centerline of the opener discs 14, which corresponds with the center of the seed groove 16, passes through the vertical plane within which the stem 32 and the housing 34 are disposed. Thus, it can be stated that the tiller 28 is centered with respect to, or forwardly aligned with, the planter 10 with which it is associated.

Figure 4:
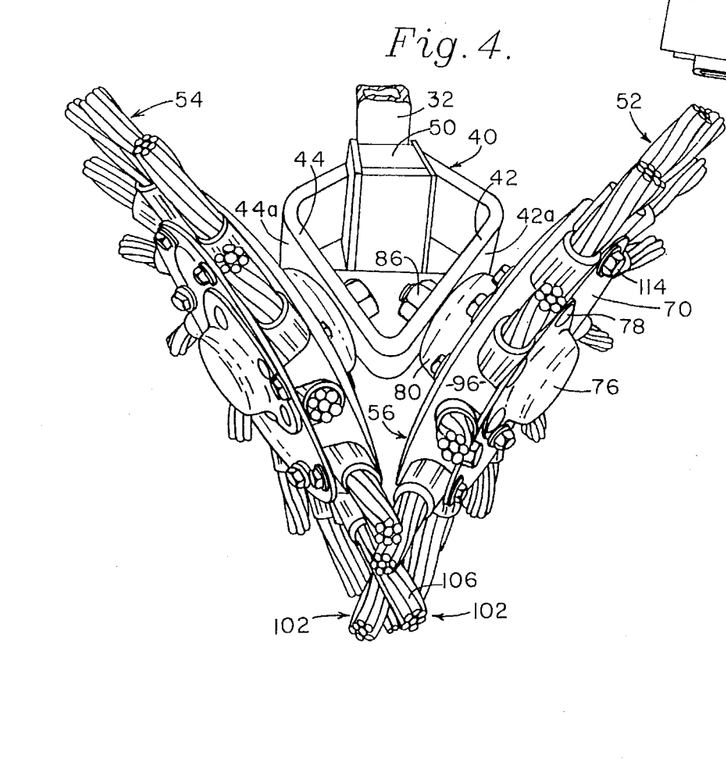
FIG. 4 is a fragmentary, top front perspective view of the tiller.
Figure 5:
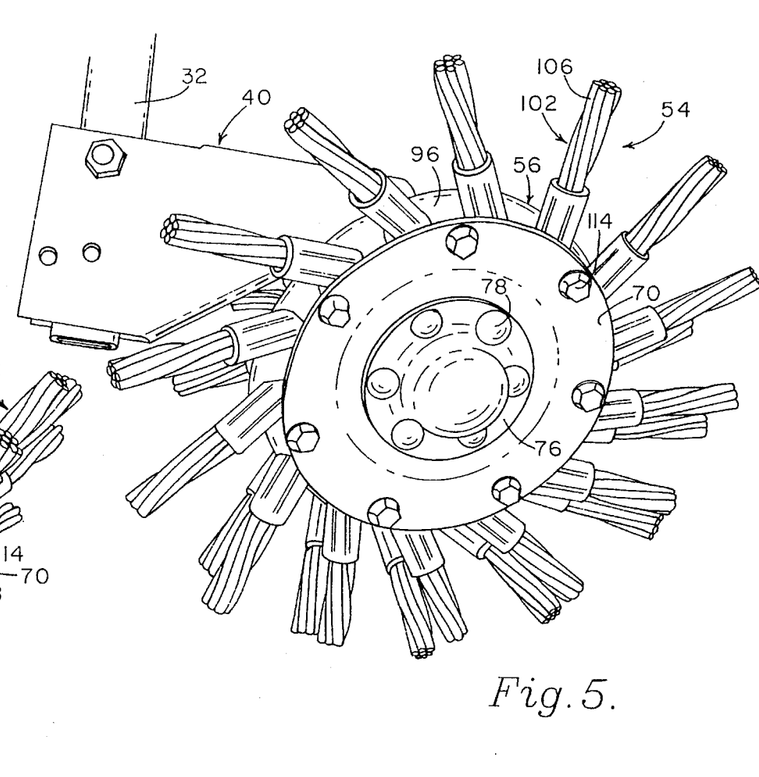
FIG. 5 is a fragmentary, right side elevational view thereof.
Figure 6:
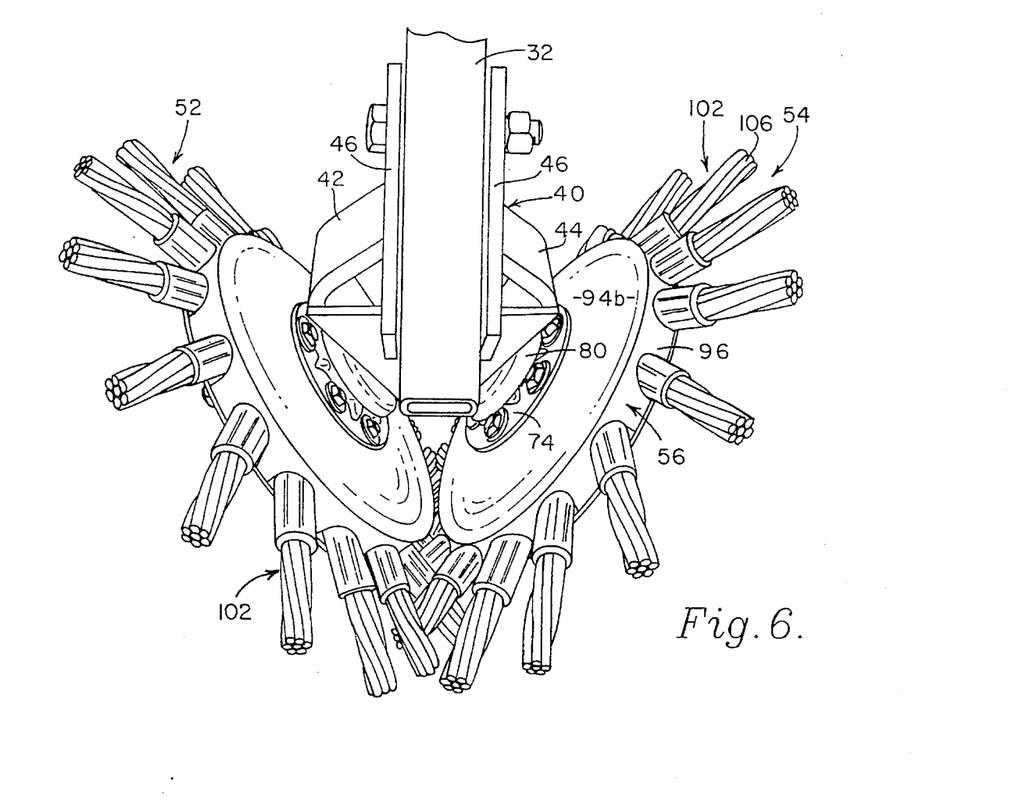
FIG. 6 is a fragmentary, lower, rear perspective view of the tiller.
Figure 7:
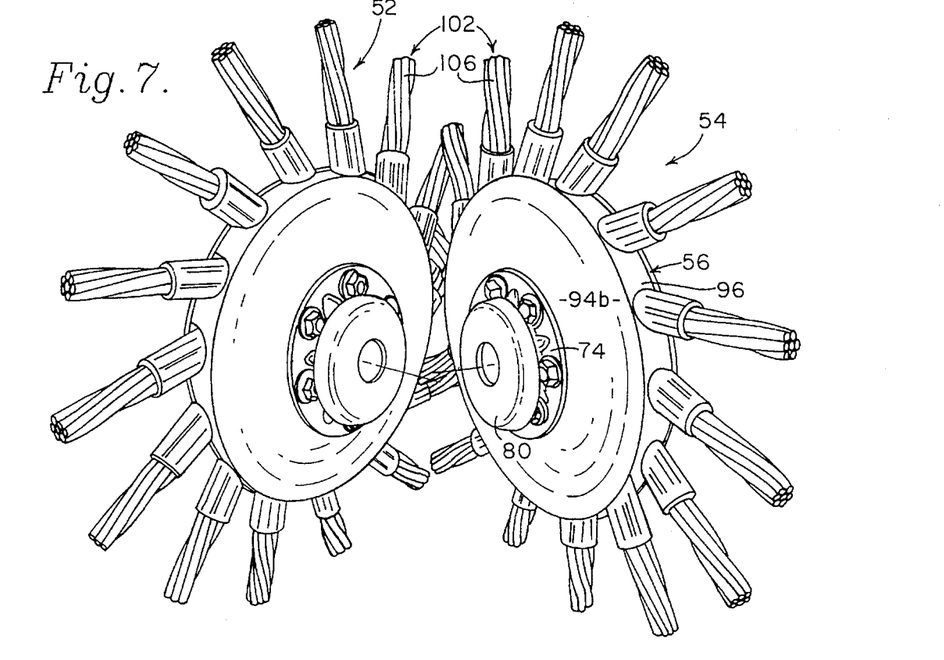
FIG. 7 is a top perspective view of the tiller with the mounting support removed to reveal details of construction and the interdigitated relationship of the spokes.
Figures 10, 15, 16, 17:
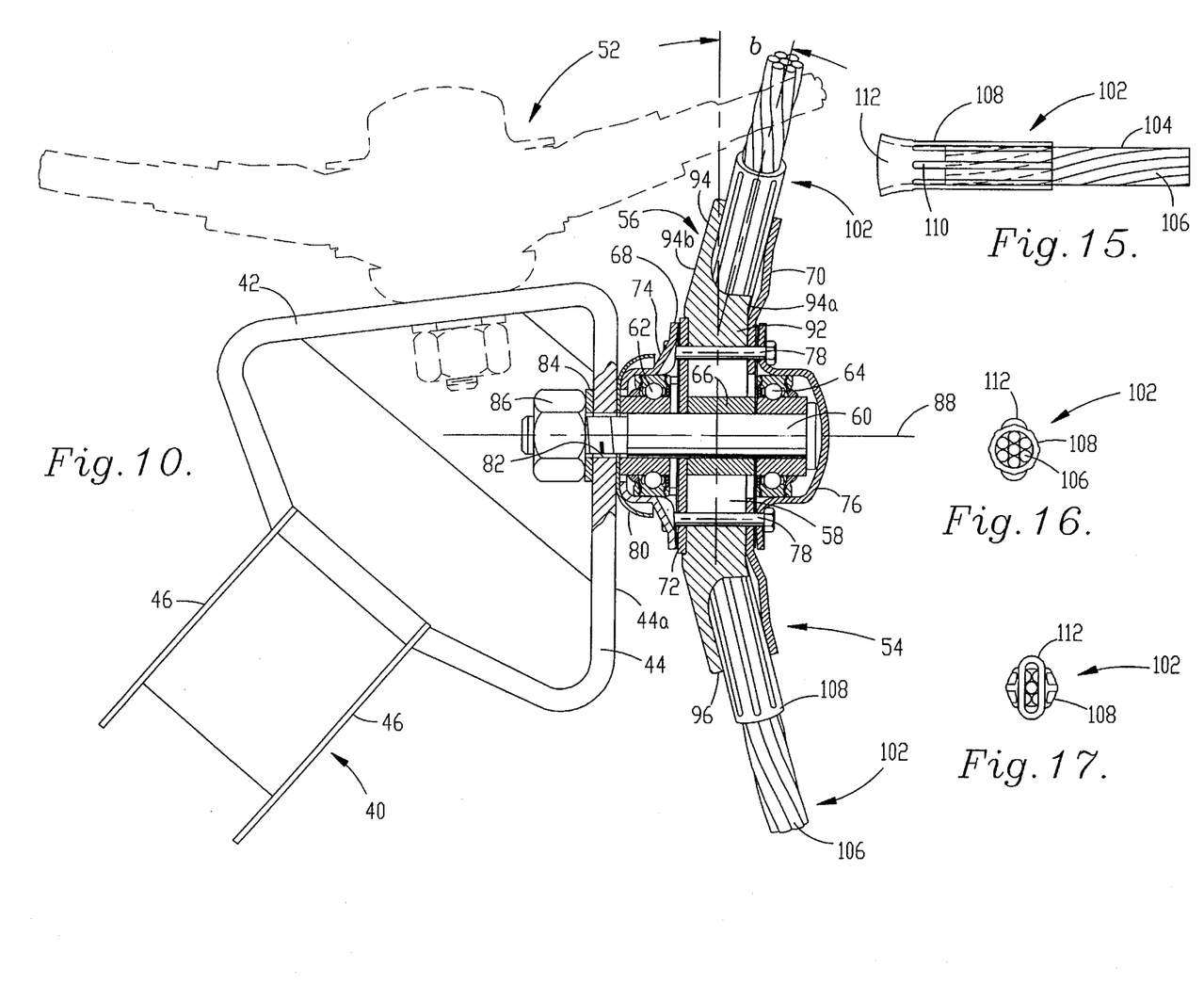
FIG. 10 is a fragmentary top plan view of the wheel support with one of the wheels shown in horizontal cross section to reveal internal details of construction, the other wheel of the tiller being shown in phantom.
FIG. 15 is a plan view of one of the individual spokes.
FIG. 16 is an outer end elevational view thereof.
FIG. 17 is an end elevational view of the inner attaching end of the spoke.

The support 40 is bolted or otherwise secured to the bottom end of the stem 32 and has a generally diamond or triangular shaped configuration when viewed in plan (see, for example, FIGS. 4 and 10). The forwardmost, triangular head of the support 40 includes a pair of integrally connected, rearwardly diverging plates 42 and 44 having in turned rear ends which merge with and are secured to upright side plates 46 and 48 of the support 40. A downwardly and forwardly inclined stiffener plate 50 spans the distance between the two side plates 46 and 48 along their front extremity and is welded thereto. As illustrated, the triangular head of the support 40 is angled downwardly and forwardly, and the laterally outwardly facing surfaces 42a and 44a of the plates 42, 44 are correspondingly caused to face downwardly and outwardly.

The tiller 28 has as its primary components a pair of left and right, spoked wheels 52 and 54, respectively, that are rotatably mounted on the support 40 at the lower front extremity of the latter in side-by-side, juxtaposed relationship and on opposite sides of the centerline of the row. As will be seen, the wheels 52 and 54 are individually rotatably mounted on the support 40 and are disposed to converge downwardly and forwardly in such a manner that the spokes of the two wheels mutually overlap, intersect with, and cross one another along the lower front extremity and bottom portion of the wheels.

As illustrated in FIG. 10 with respect to the wheel 54, each of the wheels comprises an annular carrier disc 56 having a central through bore 58. A mounting bolt 60 passes centrally through the bore 58 and out beyond the opposite ends thereof for supporting a pair of axially spaced bearing assemblies 62 and 64. The bearing assemblies 62, 64 are separated on the bolt 60 by a central spacer 66 and by annular plates 68 and 70 at opposite ends of the spacer 66. The plate 68 is located in a recess 72 on the back or inside surface of the disc 56, while the plate 70 is disposed on the outer face or surface of the disc 56. Inner and outer hub caps 74 and 76, respectively, cover the bearing assemblies 62 and 64, respectively, and the entire central hub assembly thus presented is secured to the disc 56 by a series of bolts 78 passing completely through the central bore 58 and projecting outwardly beyond opposite ones of the hub caps 74, 76. The inner hub cap 74 also is provided with a dust cup 80 that covers the otherwise open end of the hub cap 74 and itself is provided with a through hole to permit passage of the inner end portion of the pivot bolt 60.

The inner threaded end of the pivot bolt 60 passes through a hole 82 in the plate 44 of the carrier 40 and has a washer 84 and nut 86 placed on the innermost end thereof for securing the bolt 60, and thus the wheel 54, onto the plate 44 of the support 40. By virtue of this arrangement, the wheel 54 is adapted to rotate freely about the axis of rotation designated by the numeral 88 in FIG. 10, such axis 88 corresponding to the longitudinal axis of the pivot bolt 60.

Figures 11, 12, 13, 14:
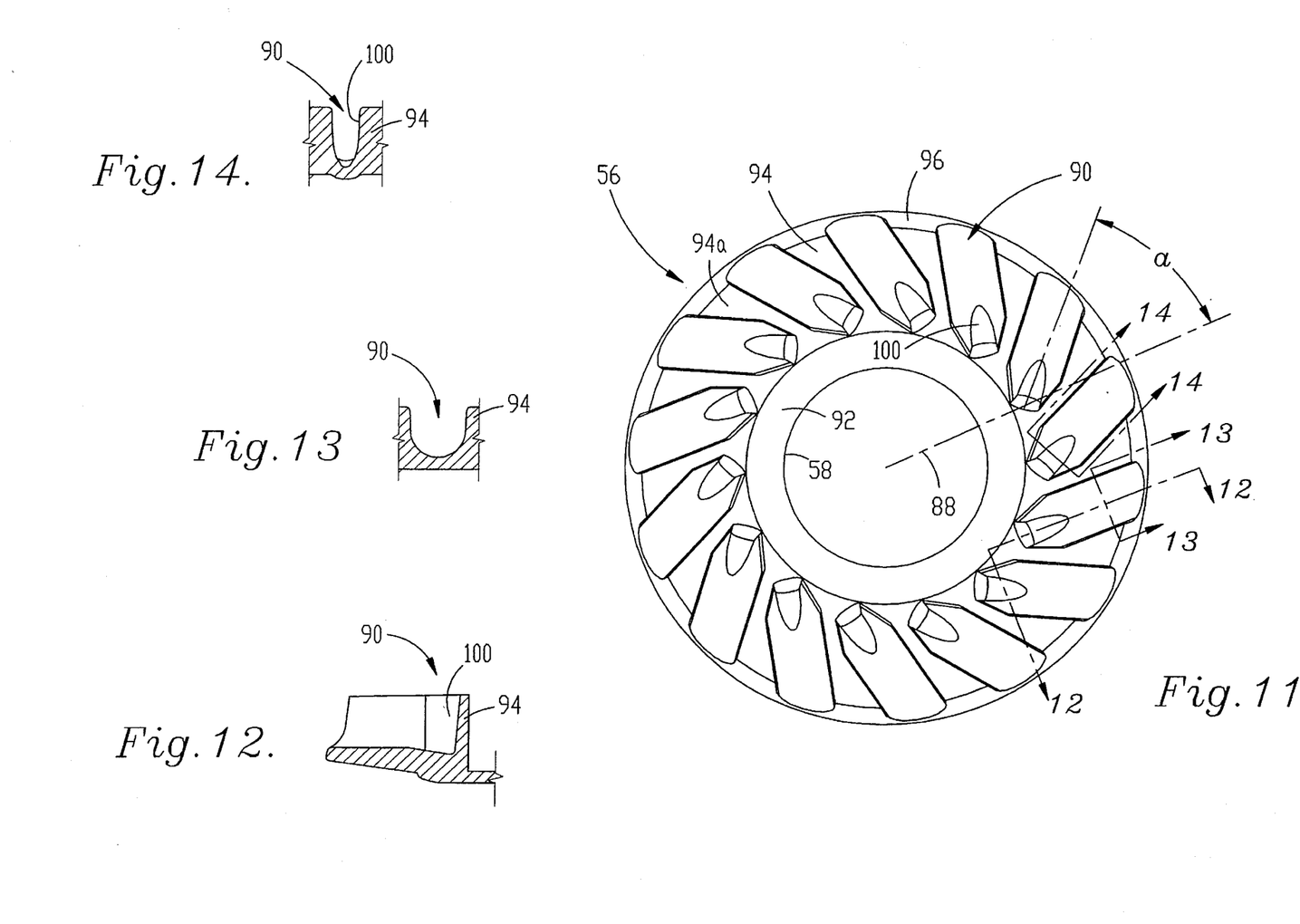
FIG. 11 is a plan view of the carrier disc of the wheel to which the spokes are secured.
FIG. 12 is a fragmentary cross-sectional view through one of the spoke-receiving pockets of the carrier disc taken substantially along line 12—12 of FIG. 11.
FIG. 13 is a transverse cross-sectional view of the pocket taken substantially along line 13—13 of FIG. 11.
FIG. 14 is a transverse cross-sectional view of one of the pockets taken substantially along line 14—14 of FIG. 11.

As shown in FIGS. 11–14, the outwardly facing surface of the disc 56 is provided with a circumferentially extending series of specially configured and specially oriented pockets 90 for receiving a number of spokes, as will subsequently be described. The pockets 90 are arranged around the center of the disc in a circular pattern, with each pocket 90 having a longitudinal axis that approaches the center at an oblique angle rather than radially. As illustrated in FIG. 13, each pocket is generally trough-like with a generally U-shaped transverse cross-section.

The carrier disc 56 has a central, annular flat hub portion 92 that extends radially outwardly from the axis 88. The bore 58 extends through such central hub portion 92. In addition, the disc 56 includes an inclined flange portion 94 that is integral with the hub portion 92 but projects outwardly therefrom in a non-radial manner with respect to the axis 88. In a preferred embodiment, the flange portion 94 slopes outwardly at an angle "b" of approximately 15° from a perpendicular to the axis 88, resulting in a slope angle of approximately 75° from the axis 88. Thus, the flange portion 94 renders the corresponding outer extremity of the wheel 54 somewhat concave or dish-shaped. The marginal portion 94 has a front or outer surface 94a and a rear or inner surface 94b which are mutually parallel and extend at the same oblique angle as the marginal portion 94 itself from the axis 88. As a result, the pockets 90 likewise extend outwardly at an oblique angle which corresponds to that of the surfaces 94a and 94b.

The carrier disc 56 is also provided with an outermost circumferential, inclined flat edge 96 that interconnects the front and rear surfaces 94a and 94b. The edge 96 slopes laterally outwardly and radially inwardly such that the diameter of the disc 56 at the intersection of edge 96 with the front surface 94a is slightly less than its diameter at the intersection of the edge 96 with the rear surface 94b.

The pockets 90 are disposed within the flange portion 94 of the disc 56 and extend from an inner point closely adjacent to the hub portion 92 to a terminal point intersecting with the outer edge 96. Consequently, the pockets 90 may be described as having their outer ends open in a generally radially outer direction, while their inner ends are closed in a generally radially inner direction. Each of the pockets 90 is provided with a non-circular depression 100 at their inner ends, as illustrated particularly in FIGS. 11, 12, and 14, such depression 100 being deeper than the rest of the pocket 90 and having a narrowed configuration compared to the rest of the pocket. Such slender depression 100 is useful in properly retaining the spokes of the wheel, as will subsequently be seen. As shown in FIG. 11, each of the pockets 90 extends inwardly generally toward the center of the disc 56 at an angle "a" of approximately 45° from a truly radial orientation.

The wheel 54 includes a number of identical ground penetrating spokes 102 carried by the disc 56. As illustrated particularly in FIGS. 15, 16, and 17, each spoke 102 is preferably formed by a section of thick "aircraft cable", such section being broadly denoted by the numeral 104 and comprising seven individual, side-by-side strands 106 of metal wire twisted into a unitary body. One type of suitable cable for the spoke section 104 is available from the Union Wire Rope Company of Kansas City, Mo., as ⅝" diameter, "1×7" cable, Grade "Extra High Strength", ASTM 475. Another suitable cable stock from Union Wire Rope has a slightly higher tensile strength and is identified as 0.600" diameter, "1×7" cable, Grade "270" ASTM, A416. In its preferred form, the cable section 104 is to have a slight amount of flexibility, although only a nominal amount, so that objects such as stones and the like will not break the spokes when impacted and will tend to dislodge themselves from between the spokes rather than becoming permanently wedged there within.

Each spoke 102, in addition to the section 104 of metal cable, also comprises a ferrule 108 that is sleeved over the cable section 104 and is longitudinally crimped, such as at crimping grooves 110 to secure itself to the cable section 104. Additionally, the innermost end of the ferrule 108 is flattened to provide a non-circular flattened terminus 112 that is adapted to be matingly and complementally received within the depression 100 of one of the pockets 90 when the spoke 102 is installed therein. A suitably dimensioned spoke 102 has a 4⅝" long section 104, a 2⅞" long ferrule 108, and an overall assembled length of 5½".

Figures 8, 9:
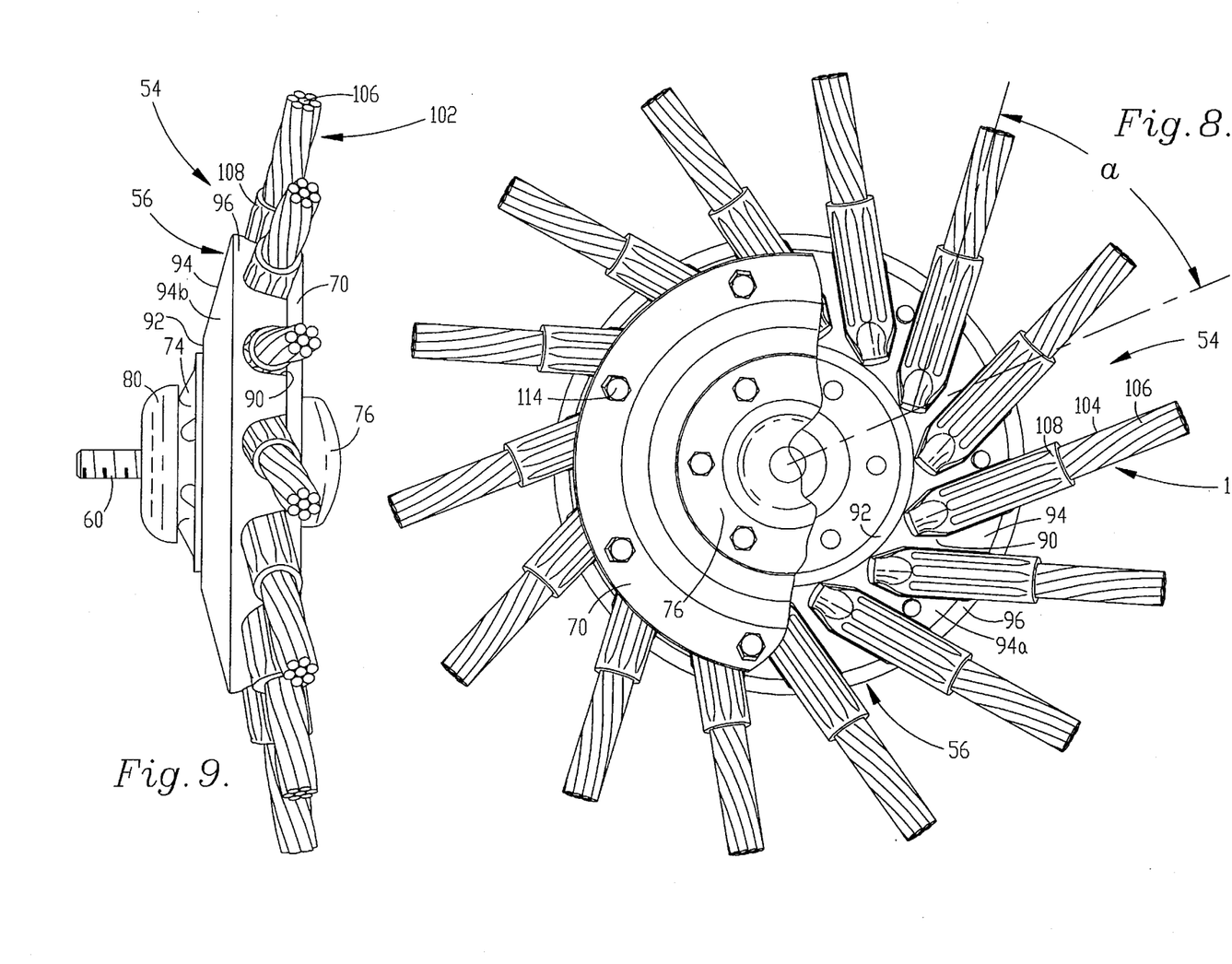
FIG. 8 is a side elevational view of one of the spoked wheels of the tiller with the cover plate of the wheel broken away to reveal mounting details of the individual spokes.
FIG. 9 is a front elevational view of one of the spoked wheels showing in particular the obliquely laterally inclined attitude of the spokes relative to the axis of rotation of the wheel.

Thus, as shown in FIGS. 8 and 10 in particular, the spokes 102 are complementally received within the pockets 90 with the flattened terminus 112 complementally received within the slender depression 100. This tends to prevent rotation of each of the spokes 102 during use and helps anchor the spokes in proper orientation.

It may be helpful to apply a putty-like substance to the underside of the ferrules 108 of the spokes 102 for retaining the spokes 102 in place during initial fabrication and assembly of the wheels 52, 54. The cover plate 70 which overlies the front surface 94a of the marginal portion 94 of the carrier disc 56 serves to cover over and bear against the ferrules 108 of the spokes 102 so as to tightly clamp all of the spokes 102 in their firmly seated positions within the retaining pockets 90. Such cover plate 70 is retained in place not only by the bolts 78 associated with the hub cap 96, but also by a series of screws 114 which are threaded into the land areas between the pockets 90 and draw the outer peripheral portion of the plate 70 tightly against the spokes 102. As a consequence, the spokes 102 are retained and held at the angles established by their receiving pockets 90, such angles including a rake back angle "a" of approximately 45°, as illustrated in FIG. 8, and a flared out angle "b" of approximately 15° (752 from the axis 88), as illustrated in FIG. 10. As a result of the fabrication of the spokes 102 from sections of cable, the overall general configuration of the cable sections is cylindrical and the outermost end of each section 104 is blunt. In addition, due to the twisted strand-like nature of each cable section 104, the peripheries of each of the spokes exposed to the soil are undulating or corrugated in nature, which is of some assistance in agitating the soil, as will hereinafter be explained.

Operation

Figure 2:
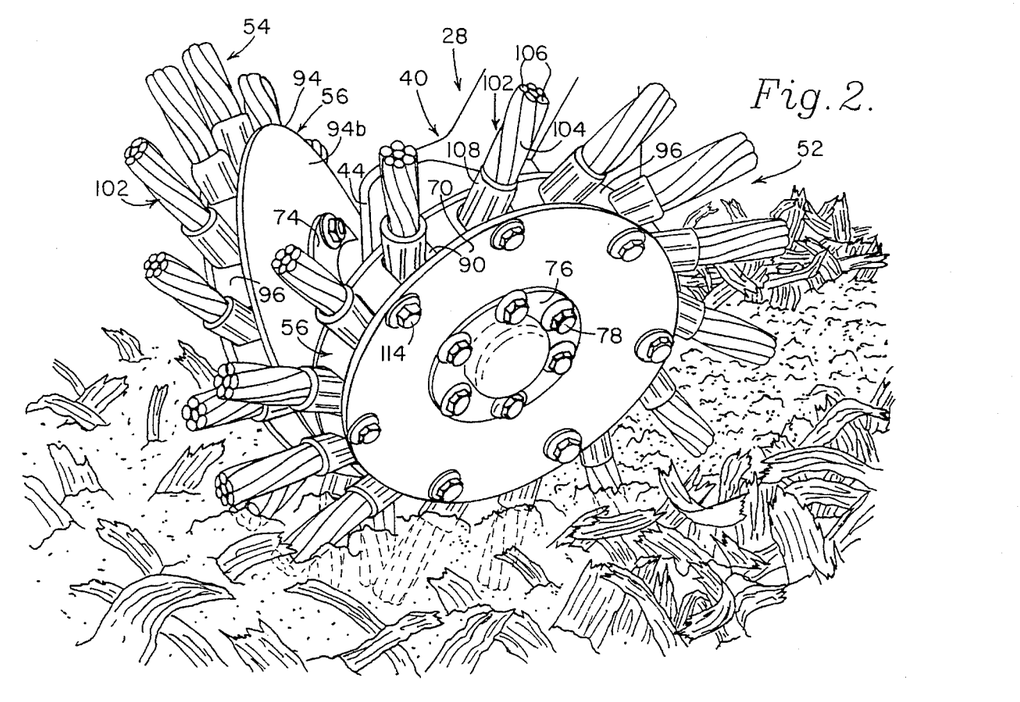
FIG. 2 is an enlarged, fragmentary, left front perspective view of the tiller as it works the soil in advance of the planter opener.

The two wheels 52 and 54 are installed on the support 40 in such a manner that their spokes 102 overlap and intersect one another along the lower front margin of the tiller 28 and its bottom extremity. The crossed relationship of the spokes 102 extends from the lower front extremity of the tiller to an area adjacent the low point on the arcuate paths of travel of the spokes. Such overlap and intersection is particularly illustrated in FIGS. 2 and 4–7. Generally speaking, the two wheels 52 and 54 cooperate to penetrate, churn, cultivate, disturb and work the soil as the implement is moved forwardly, generally in the same manner as the soil crumbling wheels of the Dutch patent specification to Burger 6810893. They also serve to clear away residue so that a nicely tilled and cleared, relatively narrow band-like zone of prepared soil 116 is left behind, as illustrated in FIG. 2.

Although the depth of penetration of the wheels 52 and 54 can be adjusted through the telescoping stem 32, it has been found that best results are obtained when the spokes 102 penetrate the soil to a depth of approximately 2 to 3 inches. At this depth, the spokes 102 intersect one another at a point above the soil surface, as shown in FIG. 2, and work their way rearwardly through the soil while remaining intersected until separating near the rear part of their soil engagement as they then withdraw upwardly out of the soil. It will be noted in this respect that due to the rearward rake angle "a" imparted to the spokes 102, the spokes 102 strip out of the soil at the rear side of their cycle of rotation in a much more vertical sense than would otherwise be the case, thus helping to leave the soil in place within the tilled zone 116 instead of causing it to be displaced to one side. Consequently, the opener discs 14 trailing the tiller 28 are presented with a seeding zone having good soil tilth and a relatively residue-free surface so that the trench preparation and seed deposit can be carried out in the optimum manner.

Due to the outward flaring of each spoke 102 at angle "b" (as illustrated in FIG. 10, for example), as the spokes from both wheels run through the soil in a crossed condition their longitudinal surfaces are disposed closer together for a longer period of time than would otherwise be the case, whereby to more thoroughly compress, massage, and agitate the soil particles between such working surface. Additionally, as earlier mentioned, the outward flaring of the spokes 102 provides a somewhat dish-like or concave overall configuration for the outer faces of the wheels 52 and 54, which is helpful in turning aside crop residue and the like as the wheels are rolled forwardly in penetrating engagement with the ground, as shown in FIG. 2.

Consequently, it will be seen that the present invention provides a highly useful and effective tiller which is highly conducive to conservation farming practices without requiring major design changes in the basic planter equipment itself. Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. A zone tiller attachment for a farm implement for use in tilling a strip of loosened soil and simultaneously deflecting trash out of the tilled strip, said attachment comprising:

a support adapted for mounting on said implement; and a pair of generally upright, downwardly and forwardly converging spoked wheels rotatably mounted on said support, each of said wheels comprising a generally dish-shaped body having a slightly concave front side, a slightly convex back side, and an outermost, circumferential periphery, said body including a central, generally circular trash-deflecting portion and a marginal spoked tillage portion encircling said trash-deflecting portion, said trash-deflecting portion extending approximately one-half the radial distance from said center axis to the periphery of the body and the spoked portion extending the balance of the radial distance from said axis to the periphery of the body, said trash-deflecting portion having an imperforate front face on the front side of the body for engaging and deflecting trash out of the strip when the wheel is in use on the implement and the wheel is rolling along the strip at an oblique angle to the strip, said spoked portion including a peripheral series of circumferentially spaced, elongated, straight spokes projecting beyond the trash-deflecting portion, said support including structure for positioning the wheels in side-by-side relationship for ground-driven rotation about respective, generally transverse axes as the tiller is moved forward with the spokes of the wheels in penetrating engagement with the ground, the wheels being so positioned that the spokes move through arcuate paths of travel during rotation of the wheels and overlap into crossed relationship with one another along the bottom of the tiller and the lower front extremity thereof, each of said spokes being raked back with respect to the direction of rotation of the wheels such that the spokes approach the center of their wheel obliquely with an inner end of each spoke leading an outer, trailing end thereof with respect to said direction of rotation, said crossed relationship of the spokes extending from the lower front extremity of the tiller to an area adjacent the low point on the arcuate paths of travel of the spokes so that the crossed spokes are disposed for churning and cultivating the soil as they move rearwardly through the soil, leaving a band-like zone of tilled soil in their wake.

2. A zone tiller attachment, as claimed in claim 1, said spokes being disposed at a raked back angle of approximately 45° from a radial orientation.

3. A zone tiller attachment, as claimed in claim 2, said spokes of each wheel being angled outwardly away from a laterally outer side face of the wheel at an oblique angle to the axis of rotation of the wheel.

4. A zone tiller attachment, as claimed in claim 3, said oblique angle being approximately 75°.

5. A zone tiller attachment, as claimed in claim 1, said spokes of each wheel being angled outwardly away from a laterally outer side face of the wheel at an oblique angle to the axis of rotation of the wheel.

6. A zone tiller attachment, as claimed in claim 5, said oblique angle being approximately 75°.

7. A zone tiller attachment, as claimed in claim 1, each of said spokes being generally cylindrical and having a blunt outermost end.

8. A zone tiller attachment, as claimed in claim 7, each of said spokes being constructed from a section of metal cable having a number of elongated, side-by-side strands twisted into a common, unitary body.

9. A zone tiller attachment, as claimed in claim 8, each of said cable sections being slightly flexibly resilient to promote the release of solid objects tending to become wedged between the spokes.

10. A zone tiller attachment, as claimed in claim 1, each wheel including a rotatable carrier disc having a laterally outwardly facing surface, said surface having a circumferentially extending series of pockets therein and configured to complementally receive respective inner attaching portions of the spokes, said wheel further including an annular cover plate overlying said attaching portions of the spokes and releasably secured to the disc to retain the spokes in place.

11. A zone tiller attachment, as claimed in claim 10, each of said pockets having a depression therein at the inner end thereof, each of said spokes having a non-circular inner terminus complementally received within said depression to discourage rotation of the spokes about their longitudinal axes during operation.

12. A zone tiller attachment, as claimed in claim 10, each of said spokes being constructed from a section of metal cable having a number of elongated, side-by-side strands twisted into a common, unitary body, each cable section having a ferrule sleeved over an inner end portion of the cable section.

13. A zone tillage wheel for a farm implement for use in tilling a strip of loosened soil and simultaneously deflecting trash out of the tilled strip, said zone tillage wheel comprising:

a generally dish-shaped body having a slightly concave front side, a slightly convex back side, and an outermost, circumferential periphery; and means for mounting said body on the implement for rotation about a generally transverse, generally horizontal, center axis as the implement is advanced, said body including a central, generally circular trash-deflecting portion and a marginal spoked tillage portion encircling said trash-deflecting portion, said trash-deflecting portion extending approximately one-half the radial distance from said center axis to the periphery of the body and the spoked portion extending the balance of the radial distance from said axis to the periphery of the body, said trash-deflecting portion having an imperforate front face on the front side of the body for engaging and deflecting trash out of the strip when the wheel is in use on the implement and the wheel is rolling along the strip at an oblique angle to the strip, said spoked portion including a peripheral series of circumferentially spaced, elongated, straight spokes projecting beyond the trash-deflecting portion for penetrating and working the soil during use, each of said spokes being raked back with respect to a direction of rotation of the wheel such that the spokes approach the center axis of the wheel obliquely with an inner end of each spoke leading an outer, trailing end thereof with respect to said direction of rotation, said spokes of the wheel being angled outwardly away from said face of the deflecting portion at an oblique angle to the axis of rotation of the wheel.

14. A zone tillage wheel as claimed in claim 13, said spokes being disposed at a raked back angle of approximately 45° from a radial orientation.

15. A zone tillage wheel as claimed in claim 13, said oblique angle being approximately 75°.

16. A zone tillage wheel as claimed in claim 13, each of said spokes being constructed from a section of metal cable having a number of elongated, side-by-side strands twisted into a common, unitary body.

17. A zone tillage wheel as claimed in claim 16, each of said cable sections being slightly flexibly resilient to promote the release of solid objects tending to become wedged between the spokes.

18. A zone tillage wheel as claimed in claim 17, each of said spokes being generally cylindrical and having a blunt outermost end.

19. A zone tillage wheel as claimed in claim 13, each of said spokes having a blunt outermost end.

20. A zone tillage wheel as claimed in claim 13, said disc having an outwardly facing, side surface, said surface having a circumferentially extending series of pockets therein and configured to complementally receive respective inner attaching portions of the spokes, said wheel further including an annular cover plate overlying said attaching portions of the spokes and releasably secured to the disc to retain the spokes in place.

21. A zone tillage wheel as claimed in claim 20, each of said pockets having a depression therein at the inner end thereof, each of said spokes having a non-circular inner terminus complementally received within said depression to discourage rotation of the spokes about their longitudinal axes during operation.

22. A zone tillage wheel as claimed in claim 20, each of said spokes being constructed from a section of metal cable having a number of elongated, side-by-side strands twisted into a common, unitary body, each cable section having a ferrule sleeved over an inner end portion of the cable section.

* * * * *